United States Patent Office 3,221,010
Patented Nov. 30, 1965

3,221,010
5,6-SUBSTITUTED DIHYDRO-5-FLUORO-PYRIMIDINE NUCLEOSIDES
Robert Duschinsky, Essex Fells, N.J., assignor to Hoffmann-La Roche Inc., Nutley, N.J., a corporation of New Jersey
No Drawing. Filed May 2, 1963, Ser. No. 277,440
12 Claims. (Cl. 260—211.5)

This invention relates, in general, to novel chemical compounds and to processes for the production thereof. More particularly, the invention relates to nucleosides of 5-fluorinated pyrimidines and to methods for preparing such compounds

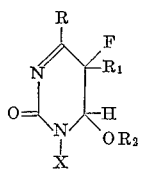
(I)

in which the symbol R represents either a hydroxy or an amino group; the symbol $R_1$ represents a hydrogen or a halogen atom; the symbol $R_2$ represents a hydrogen atom or an alkyl or acyl group; and the symbol X represents ribose, α-deoxyribose or β-deoxyribose, or an acylated derivative thereof, attached in glycosidic linkage to the 1-position of the pyrimidine nucleus.

Thus, the foregoing Formula I embraces, and the invention includes, nucleosides of 5-fluorouracil having the formula:

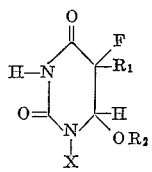
(II)

as well as nucleosides of 5-fluorocytosine having the formula:

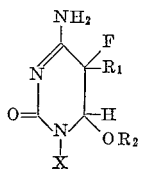
(III)

in which Formulas II and III, the symbols $R_1$, $R_2$, and X, have the same meanings as in Formula I.

Thus, in one of its aspects, the invention relates to N-ribosides of 5-fluorouracil and 5-fluorocytosine derivatives and to processes for their production. The N-riboside compounds which are encompassed within the scope of the present invention are those having the general formula as follows:

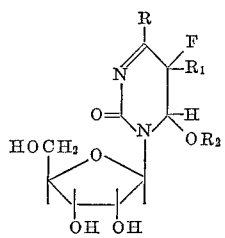
(IV)

In another of its embodiments, the invention relates to the α-anomers and β-anomers of N-deoxyribosides of 5-fluorouracil derivatives. The α-anomers which are encompassed within the scope of the present invention are those having the general formula as follows:

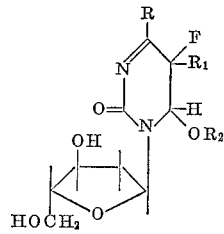
(V)

The β-anomers which are included within the scope of this invention are those having the following formula:

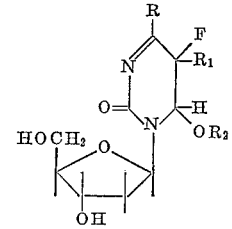
(VI)

In each of the foregoing Formulas IV, V, and VI, the symbols $R_1$, and $R_2$ have the same meaning as in Formula I.

Additionally, the present invention embodies within its scope acylated derivatives of the riboside and deoxyriboside compounds depicted in the Formulas IV, V, and VI. Thus, for example, the present invention includes acyl derivatives of N-ribosides having the formula:

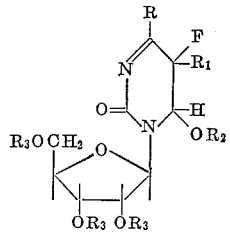
(VII)

Similarly, the invention encompasses acyl derivatives of the α-anomers of N-deoxyribosides having the formula:

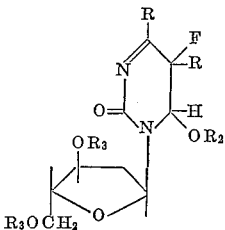
(VIII)

as well as acyl derivatives of β-anomers of N-deoxyribosides having the formula:

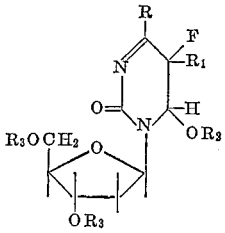
(IX)

In the foregoing Formulas VII, VIII, and IX, the symbols R, $R_1$, and $R_2$ have the same meaning as in Formula I and the symbol $R_3$ represents an aliphatic acyl group such as acetyl, propionyl, butyryl, etc. as well as an aromatic acyl group, such as benzoyl, toluoyl, etc., or a hydrogen atom, with the proviso, however, that in each of Formulas VII to IX, inclusive, at least one of the symbols $R_3$ represents an acyl group.

Chlorine, and bromine are examples of the halogen atoms which in Formulas I to IX, inclusive, are represented by the symbol $R_1$. Lower alkyl groups, that is, alkyl groups containing from 1 to 4 carbon atoms, are examples of the groups represented in each of Formulas I to IX, inclusive, by the symbol $R_2$. Thus, for example, methyl, ethyl, propyl, isopropyl, butyl, and isobutyl groups are mentioned as the alkyl groups represented by the symbol $R_2$. Lower aliphatic acyl groups, that is, the residues of lower aliphatic carboxylic acids containing from 2 to 4 carbon atoms, are representative of the groups depicted in Formulas I to IX, inclusive, by the symbol $R_2$. Such acyl groups include acetyl, propionyl, butyryl, etc. groups.

The novel compounds of this invention are readily prepared using 2'-deoxy-5-fluorourdine or 2'-deoxy-5-fluorocytidine, or an acylated derivative of either as the starting material. In preparing those compounds of Formulas I to IX, inclusive, in which $R_1$ is a halogen atom and $R_2$ is hydrogen, the starting material, that is, 2'-deoxy-5-fluorouridine, 2'-deoxy-5-fluorocytidine, or an acylated derivative of either, is reacted with a halogen and water, or with a reaction product of a halogen and water. In preparing those compounds of Formulas I to IX, inclusive, in which $R_1$ is a halogen atom and $R_2$ is an alkyl group, the starting material is reacted either with a halogen and a lower aliphatic alcohol, e.g. methanol, ethanol, propanol, isopropanol, butanol, isobutanol, etc., or with a lower aliphatic alkyl hypohalite, such as, methyl hypobromite, ethyl hypohalite, t-butyl hypohalite, etc. In the case of those compounds of Formulas I to IX, inclusive, in which $R_1$ is halogen and $R_2$ is an acyl group, these are prepared by reacting the starting material with a halogen and an acylating agent, such as, acetic anhydride, acetyl chloride, propionyl chloride, etc., in the presence of the lower monocarboxylic acid corresponding to the anhydride employed. Suitable acids are monocarboxylic acids having from 2 to 4 carbon atoms, such as, acetic acid, propionic acid, butyric acid, etc. In each of the foregoing instances, the reaction of the starting material with the halogen and either water, alcohol, or the acylating agent is carried out preferably in the absence of free hydrogen halide. The hydrogen halide can be removed by means of the use of silver carbonate, silver acetate or an anion exchange resin.

The compounds of Formulas I to IX, inclusive, wherein $R_1$ is hydrogen and wherein $R_2$ is a hydrogen atom or an alkyl or acyl group are likewise easily prepared. These compounds are obtained by hydrogenolysis of the corresponding compound of Formulas I to IX, inclusive, in which $R_1$ is a halogen atom. Hydrogenolysis is accomplished by reacting a compound of Formula I to IX, inclusive, in which $R_1$ is a halogen, with hydrogen in the presence of a platinum or palladium catalyst. In this process, a buffer is preferably used with the pH being maintained within the range of about 2 to about 9.

The compounds of this invention possess asymmetrical carbon atoms and, hence, they will be obtained in the form of diastereomeric mixtures. These mixtures can be separated, if desired, into the individual diastereomers, for example, by crystallization or by conventional liquid extraction methods.

The β-anomers which are depicted in Formulas IV, VI, VII, and IX interfere with nucleic acid metabolism and thus, inhibit the growth of cells of microorganisms and, particularly, the growth of tumor cells. Accordingly, these compounds are useful as antibacterial agents as well as anti-tumor agents. Such compounds are believed to function as transport forms of anti-metabolites such as, 5-fluorouridine, 2'-deoxy-5-fluorouridine, or 2'-deoxy-5-fluorocytidine in which the 5,6-dihydro nucleoside is not cleaved enzymatically until it is released as the unsaturated nucleoside or nucleotide at the proper site under biological conditions. Certain compounds of the invention, when tested in transplantable mice tumors, were found to be cancerostatic. Against some tumors, the compounds of this invention exerted an inhibitory activity of the same order of magnitude as the nucleoside which was used as the starting material. Against other tumors, however, some of the compounds have been shown to be strikingly superior to the nucleoside, unsaturated in the 5,6-position, which is used as the starting material.

The α-anomers which are represented by the foregoing Formulas V and VII are biologically inactive. The α-nucleosides from which they are produced are obtained as undesired side reaction products in certain manufacturing procedures. The 5,6-dihydro nucleosides of those side products, which are produced as described herein, can be cleaved into the pyrimidine and sugar moiety by mild hydrolytic methods. Thus, the α-anomers of this invention are useful for the regeneration of the valuable pyrimidine and sugar moieties of valueless compounds.

For a fuller understanding of the nature and objects of this invention, reference may be had to the following examples which are given merely as further illustrations of the invention and are not to be construed in a limiting sense.

EXAMPLE 1

(a)

A solution of 41.6 grams (0.52 mole) of bromine in 960 ml. of methanol, cooled to a temperature of about −5° C., was mixed with vigorous stirring with 143.2 grams (0.52 mole) of silver carbonate. This mixture was stirred at a temperature of about −5° C. for a period of about 30 minutes. During this time, the solution, which originally was red in color, became light-yellow colored.

The methyl hypobromite solution which was prepared as described in the preceding paragraph was filtered directly into an ice-cold mixture of 50 grams (0.203 mole) of 2'-deoxy-5-fluorouridine and 750 ml. of methanol. This mixture was stirred with continuous cooling to a temperature of about 2° C. for a period of about 60 minutes. Thereafter, an additional 45 grams of silver carbonate was added to the mixture and stirring was continued for a period of about 60 minutes. The solution, which was pale yellow in color, was filtered and subsequently concentrated in vacuo to a volume of about 400 ml. This solution was clarified by filtration through Celite and the filtrate was evaporated to a colorless syrup which was taken up in 100 ml. of ether. The ether solution, thus obtained, was refrigerated to produce a crystalline product. The crystals were separated from the solution by filtration, washed with cooled ether and dried in vacuo at a temperature of 60° C.

There was obtained 30.46 grams of 5-bromo-5-fluoro-6-methoxy-5,6-dihydro-2'-deoxyuridine melting at 151° to 152° C.; $[\alpha]_D$ +52.6° (methanol). Addition of 110 ml. of the combined mother liquors and subsequent washing thereof yielded 24.49 grams of product melting at 112° to 115° C.; $[\alpha]_D$ +22.2.

The first crop of crystals, that is, 30.46 grams of product melting at 151° to 152° C. $[\alpha]_D$ +52.6° (methanol), was recrystallized from 55 ml. of butyl acetate. There was obtained 24.66 grams of pure d-5-bromo-5-fluoro-6-methoxy-5,6-dihydro-2'-deoxyuridine melting at 166.5° to 167.5° C. The second crop of crystals, that is, 24.49 grams of the product melting at 112° to 115° C. $[\alpha]_D$ +22.2°, was recrystallized from ethyl acetate with subsequent addition of 5 ml. of petroleum ether. The crystalline product, thus obtained, melting at 157° to 158° C. was recrystallized from 10 ml. of butyl acetate yielding 6.2 grams of the pure dextro isomer melting at 166.5° to 167.5° C. The total yield of pure d-5-bromo-5-fluoro-6-methoxy-5,6-dihydro-2'-deoxyuridine $[\alpha]_D$ +58.7° (c. 4.0 in water) represented 42.2% of theory.

*Anal.*—Calcd. for $C_{10}H_{14}BrFN_2O_6$: Br, 22.38; F, 5.32; $CH_3O$, 8.69. Found: Br, 22.18; F, 5.56; $CH_3O$ 8.55.

The levo isomer of this compound was also isolated. This was accomplished by evaporating the mother liquor from which the 24.49 grams of product (M.P. 151°–152° C.) was obtained as described heretofore, dissolving the residue, thus obtained, in water and lyophilizing the solution. The product, namely, l-5-bromo-5-fluoro-6-methoxy-5,6-dihydro-2'-deoxyuridine, was obtained in the form of a powder in a yield of 15.0 grams $[\alpha]_D^{27}$ —9.9° (c. 1.0 in water).

*Anal.*—Calcd. for $C_{10}H_{14}BrFN_2O_6$: Br, 22.38; F, 5.32; N, 7.84. Found: Br, 21.89; F, 4.98; N, 7.49.

(b) *Preparation of d-5-fluoro-6-methoxy-5,6-dihydro-2'-deoxyuridine*

A solution was prepared by dissolving 6.5 grams (0.0182 mole) of d-5-bromo-5-fluoro-6-methoxy-5,6-dihydro-2'-deoxyuridine, obtained as described previously in this example, in 115 ml. of water containing 1.55 grams (0.0189 mole) of sodium acetate. Thereafter, the d-isomer, while in such solution, was hydrogenated in the presence of 0.85 gram of 10% prehydrogenated palladium charcoal catalyst. The hydrogenation was completed in a period of about 30 minutes, during which time approximately 454 ml. of hydrogen had been taken up. The catalyst was then removed by filtration, following which the solution was lyophilized. The product, thus obtained, was subsequently dissolved in 76 ml. of water and the pH of the solution was adjusted to 6.0 using ammonium hydroxide. The solution was then absorbed on a column of Dowex 1–4X (acetate) 100–200 mesh, 2.4 x 25 cm. Elution was performed using water in Fractions 1 to 6, inclusive, and 1 N acetic acid in Fractions 7 to 10, inclusive, at a flow rate of 100 to 200 ml. per hour, the fractions being taken each 30 minutes. Each fraction was analyzed for its content of d-5-fluoro-6-methoxy-5,6-dihydro-2'-deoxyuridine. The bulk of this compound, namely, 0.01318 mole, was found in Fractions 3 and 4. Fractions 3 and 4 were lyophilized, and the dry material, thus obtained, was dissolved in 65 ml. of water, and after adjustment to pH 6, this solution was chromatographed on a Dowex 1–4X (acetate) column 2.4 x 24 cm. Elution with water, at a flow rate of 200 to 250 ml. per hour, yielded 0.01306 mole of d-5-fluoro-6-methoxy-5,6-dihydro-2'-deoxyuridine (purity 90.5%). The fractions were again lyophilized and the dry material was dissolved in 62 ml. of water and the solution was adjusted to pH 6.0. The solution was chromatographed, using water as the eluent, on a column (4 x 33 cm.) at a flow rate of 200 ml./hr. There was obtained a fraction containing d-5-fluoro-6-methoxy-5,6-dihydro-2'-deoxyuridine, 0.01125 mole of 97% purity. After lyophilization this product weighed 3.43 grams. This dry material was dissolved in a boiling mixture of 7 ml. of dioxane and 37 ml. of butyl acetate. Upon cooling there was obtained 2.58 grams of crystalline d-5-fluoro-6-methoxy-5,6-dihydro-2'-deoxyuridine melting at 136.5° to 138.5° C. $[\alpha]_D^{24}$ +44.8° (c. 1.0 in methanol).

*Anal.*—Calcd. for $C_{10}H_{15}FN_2O_6$: F, 6.83; $CH_3O$, 11.15. Found: F, 7.00; $CH_3O$, 11.35.

(c) *Preparation of l-5-fluoro-6-methoxy-5,6-dihydro-2'-deoxyuridine*

A solution was prepared by dissolving 5.0 grams of crude l-5-bromo-5-fluoro-6-methoxy-5,6-dihydro-2'-deoxyuridine, prepared as described in section (a) of this example, in 20 ml. of methanol and 10 ml. of water. This solution was mixed with a suspension of 0.25 gram of prehydrogenated 10% palladium charcoal in 20 ml. of 5% sodium acetate solution. The levo isomer was hydrogenated, thereafter, at a temperature of 23° C. and atmospheric pressure. Hydrogenation of the compound was completed in a period of about 50 minutes, during which time approximately 252 ml. of hydrogen had been taken up.

The solution, which was produced as described in the preceding paragraph, was lyophilized. The dry material was dissolved in 25 ml. of water and the aqueous solution, thus obtained, was, after adjustment to pH 6 with ammonium hydroxide, submitted to ion exchange chromatographed on a column 3.5 x 11 cm. at a flow rate of 230 ml. per hour. The chromatography procedure used was the same as that described in section (b) of this example with respect to the d-isomer. Elution of this product using 115 ml. of water, yielded 7.34 millimoles of crude l-5-fluoro-6-methoxy-5,6-dihydro-2'-deoxyuridine.

This solution was lyophilized and the dry material, thus obtained, was dissolved in 20 ml. of water, following which the solution was adjusted to pH 6 and chromatographed on a 2 x 11 cm. column. The product, after lyophilization, was then dissolved in 50 ml. of water and the solution was stirred with 10 grams of Dowex 50–X8. Subsequently, the resin was removed by filtration and washed with water. The solution was lyophilized to yield 1.89 grams of crude l-5-fluoro-6-methoxy-5,6-dihydro-2'-deoxyuridine, $[\alpha]_D^{25}$ —1.24° (c. 2.76 in water).

*Anal.*—Calcd. for $C_{10}H_{13}FN_2O_6$: C, 43.17; H, 5.43; $CH_3O$, 11.15; F, 6.83; N, 10.07. Found: C, 43.71, 43.92; H, 5.31, 5.59; $CH_3O$, 9.84, 9.89; F, 6.12, 5.90; N, 9.14, 8.71.

EXAMPLE 2

(a) *Preparation of d-5-bromo-5-fluoro-6-ethoxy-5,6-dihydro-2'-deoxyuridine*

A solution of 10 ml. (0.39 mole) of bromine in 640 ml. of ethanol was stirred with 107.5 grams (0.39 mole) of silver carbonate for a period of about 30 minutes at a temperature of about —5° C.

The light yellow-colored ethyl hydrobromite solution, which was thus obtained, was filtered rapidly into a cold solution of 30.0 grams (0.122 mole) of 2'-deoxy-5-fluorouridine in 500 ml. of ethanol. The mixture was stirred for a short period of time, following which it was allowed to stand for a period of about 16 hours with cooling. Thereafter, the mixture was concentrated in vacuo at a temperature of about 30° C. to obtain a syrup. This syrup was dissolved in 200 ml. of ethanol and, after cooling, silver carbonate was added to the solution gradually until the solution was colorless. The solution was filtered through Celite and, after evaporation in vacuo, there was obtained a pale yellow syrup which became partly crystalline upon seeding. The syrupy product was taken up in 25 ml. of butyl acetate and allowed to crystallize with cooling. There was obtained 7.06 grams of d-5-bromo-5-fluoro-6-ethoxy-5,6-dihydro-2'-deoxyuridine melting at a temperature of 128° to 129° C. The mother liquor, upon addition of petroleum ether thereto, yielded a second crop of crystals amounting to 10.0 grams, melting at a temperature of 127.5° to 128.5° C. Recrystallization of the combined crops of crystals, using 1.4 volumes of ethyl acetate, yielded d-5-bromo-5-fluoro-6-ethoxy-5,6-dihydro-2'-deoxyuridine melting at 129° to 130° C., $[\alpha]_D^{26}$ +60.2° (c. 2.0 in methanol).

*Anal.*—Calcd. for $C_{12}H_{16}BrFN_2O_6$: Br, 21.51; F, 5.12; $C_2H_5O$, 12.12. Found: Br, 20.94; F, 5.08; $C_2H_5O$, 12.22.

(b) *Preparation of d-5-fluoro-6-ethoxy-5,6-dihydro-2'-deoxyuridine*

10 grams (27 millimoles) of d-5-bromo-5-fluoro-6-ethoxy-5,6-dihydro-2'-deoxyuridine, prepared as described in section (a) of this example, were hydrogenated, while dissolved in 100 ml. of water containing 2.25 grams (27.4 millimoles) of sodium acetate in the presence of 0.5 gram of 10% palladium on charcoal catalyst. Hydrogenation was carried out over a period of about 40 minutes, during which period 630 ml. of hydrogen had been taken up. At the end of that period, the catalyst was removed from the reaction mixture by filtration and the filtrate was lyophilized. Chromatography on a Dowex acetate column (3.5 x 37 ml.) gave, upon elution with water, two fractions (320 ml.) of a weakly absorbing material. Fraction 3 (94.5 ml.), Fraction 4 (132 ml.) and Fraction 5 (132 ml.) contained 13.5 millimoles, 702 millimoles and 1.39 millimoles of d-5-fluoro-6-ethoxy-5,6-dihydro-2'-deoxyuridine, respectively.

Fraction 3 was lyophilized and the dry material, thus obtained (4.01 grams), was crystallized from 96 ml. of ethyl acetate to yield 2.79 grams (35.3% of theory) of d-5-fluoro-6-ethoxy-5,6-dihydro-2' - deoxyuridine melting at 146° to 147° C. $[\alpha]_D^{26}$ +37.2° (c. 2.0 in water).

*Anal.*—Calcd. for $C_{11}H_{17}FN_2O_6$: $C_2H_5O$, 15.42; F, 6.50. Found: $C_2H_5O$, 15.79; F, 5.94.

EXAMPLE 3

(a) *Preparation of 5-bromo-5-fluoro-6-hydroxy-5,6-dihydro-2'-deoxyuridine*

In this example, a solution of 5.0 grams (20.3 millimoles) of 2'-deoxy-5-fluorouridine in 100 ml. of water was first prepared. To this solution there was added, in a dropwise fashion, bromine until an orange color persisted and the optical density had dropped to $$E_{270}^{0.1\ N\ HCl} = 4740$$

Approximately 1.29 ml. (25 millimoles) of bromine were required to accomplish this. The solution was thereafter stirred with Dowex 1–X4 (acetate) resin. Subsequently, the resin was removed from the solution by filtration to yield a bright yellow filtrate having $$E_{270}^{0.1\ N\ HCl} = 2790$$

The filtrate was lyophilized and the residue was taken up with 25 ml. of water and once again lyophilized. This procedure was repeated two times and there was obtained 5.85 grams (85% of theory) of 5-bromo-5-fluoro-6-hydroxy-5,6-dihydro-2'-deoxyuridine in the form of a white powder, $[\alpha]_D^{26.5}$ +12° (c. 1.5 in methanol);

$$E_{270}^{0.1\ N\ HCl} = 3010$$

*Anal.*—Calcd. for $C_9H_{12}BrFN_2O_6$: Br, 2329; F, 5.54; N, 8.16. Found: Br, 22.69, 22.41; F, 4.75, 4.58; N, 7.28, 7.55.

(b) *Preparation of 5-fluoro-6-hydroxy-5,6-dihydro-2'-deoxyuridine*

A solution was prepared by dissolving 355 mg. of 5-bromo-5-fluoro-6-hydroxy-5,6-dihydro - 2' - deoxyuridine, prepared as described in section (a) of this example, in 15 ml. of water containing 88 mg. (1.07 millimoles) of sodium acetate. The 2'-deoxyuridine compound was thereafter, hydrogenated while in solution using 40 mg. of 10% palladium on charcoal as the catalyst. In a period of about 20 minutes, 22.3 ml. of hydrogen had been taken up. At the end of that period of time, the solution was filtered to remove the catalyst therefrom.

Thereafter, a portion of the filtrate containing 0.61 millimole of product was adjusted to pH 7 with sodium hydroxide and the solution was chromatographed on a Dowex 1–4X (acetate) column (1.4 x 15.5 cm.). Fractions 2 and 3, which were obtained by elution with water were combined, rendered free of sodium ions by stirring with a small amount of Dowex 50 and subsequently lyophilized. There was thereby obtained 0.135 gram of 5-fluoro-6-hydroxy-5,6-dihydro-2'-deoxyuridine.

*Anal.*—Calcd. for $C_9H_{13}FN_2O_6 + \frac{1}{2}H_2O$: C, 39.56; H, 5.16; F, 6.95; N, 10.25. Found: C, 39.67; H, 5.61; F, 6.59; N, 9.61.

EXAMPLE 4

*Preparation of 5-bromo-5-fluoro-6-methoxy-5,6-dihydro-2'-deoxyuridine diacetate*

In this example, a methyl hypobromite solution (65 millimoles) was prepared from 10.4 grams of bromine, 34.0 grams of silver carbonate and 270 ml. of methanol. This solution was added gradually, with cooling, to a solution of 9.72 grams (29.4 milllimoles) of 2'-deoxy-5-fluorouridine diacetate in 300 ml. of methanol. Addition of the methyl hypobromite solution was discontinued when the optical density of the mixture $$(E_{280}^{ethanol})$$

had dropped to 5320. The solution was evaporated to a syrup, which upon trituration with 50 ml. of ethanol and cooling with dry ice, became crystalline. The crystalline product was filtered and washed with cold ether to yield 6.81 grams of 5-bromo-5-fluoro-6-methoxy-5,6-dihydro-2'-deoxyuridine diacetate melting at 118° to 119° C. Addition of 50 ml. of petroleum ether to the mother liquor yielded a second crop of crystals amounting to 4.38 grams of 5 - bromo - 5 - fluoro-6-methoxy-5,6-dihydro-2'-deoxyuridine diacetate melting at 109° to 112° C. The first crop, that is, the crystals melting at 118° to 119° C., was recrystallized by dissolving same in 20 ml. of hot ethyl acetate, filtering the solution and adding 35 ml. of petroleum ether thereto. There was obtained a yield of 5.83 grams of 5-bromo-5-fluoro-6-methoxy-5,6-dihydro-2'-deoxyuridine diacetate. The second crop of crystals, that is, the crop melting at 109° to 112° C. was recrystallized from a mixture of 5 ml. of methanol and 10 ml. of water to yield 3.97 grams of 5-bromo-5-fluoro-6-methoxy-5,6-dihydro - 2' - deoxyuridine diacetate. The combined yield amounted to 75% of theory and the combined batch melted at a temperature of 118° to 119° C.

For analysis purposes, a sample of the product, prepared as described in the preceding paragraph, was recrystallized from ethyl acetate and petroleum ether. There was obtained 5-bromo-5-fluoro-6-methoxy-5,6-dihydro-2'-deoxyuridine diacetate melting at a temperature of 120° to 121° C. $[\alpha]_D^{25}$ —6.0° (c. 2.0 in methanol).

*Anal.*—Calcd. for $C_{14}H_{18}BrFN_2O_8$: Br, 18.11; $CH_3O$, 7.03. Found: Br, 18.29; $CH_3O$, 7.18.

A solution containing 882 mg. (2.0 millimoles) of 5-bromo-5-fluoro-6-methoxy-5,6-dihydro-2'-deoxyuridine diacetate (prepared as described in the preceding paragraph), 15 ml. of methanol and 164 mg. (2 millimoles) of sodium acetate was hydrogenated in the presence of 200 mg. of 10% palladium on charcoal catalyst. Over a period of about five minutes, 42 ml. of hydrogen were taken up to produce 5-fluoro-6-methoxy-5,6-dihydro-2'-deoxyuridine diacetate.

EXAMPLE 5

*Preparation of 5-bromo-5-fluoro-6-methoxy-5,6-dihydro-2'-deoxyuridine di-p-toluate*

In this example, a solution of methyl hypobromite (60.5 millimoles) was prepared from 9.66 grams of bromine, 33.3 grams of silver carbonate and 200 ml. of methanol. This methyl hypobromite solution was added to a solution of 19.3 grams (40 millimoles) of 2'-deoxy-5-fluorouridine-di-p-toluate in 175 ml. of dimethyl formamide. Addition of the methyl hypobromite solution was discontinued when the optical density $$(E_{280}^{CH_3OH})$$

of the reaction mixture had dropped from its initial value of 262,000 to 81,000 units. Thereafter, the reaction mixture was filtered and the filtrate was partially evaporated in vacuo. The residue which remained after the evaporation step had been completed, was diluted with 100 ml. of water and precipitation of an oil-like product occurred. This product was taken up with 50 ml. of methanol and the solution was poured into 450 ml. of water. A solid product separated which subsequently was dissolved in 50 ml. of chloroform. The chloroform solution was then dried over sodium sulfate, filtered and evaporated. A glassy residue was obtained and this residue was crystallized from 60 ml. of ether. A second crop of crystals was obtained by concentration of the mother liquor to about 30 ml. There was obtained by this procedure a total yield of 8.6 grams (36% of theory) of 5-bromo-5-fluoro-6-methoxy-5,6-dihydro-2′-deoxyuridine di-p-toluate melting at a temperature of 168° to 169° C.

To further purify the product for analysis purposes, 1.0 gram of 5-bromo-5-fluoro-6 - methoxy-5,6 - dihydro-2′-deoxyuridine di-p-toluate, obtained as described in the preceding paragraph, was taken up with 20 ml. of boiling methanol. The solution was filtered while hot. Upon cooling the filtrate, there was obtained 0.6 gram of a crystalline 5-bromo-5-fluoro-6-methoxy-5,6-dihydro-2′-deoxyuridine di-p-toluate melting at 170° to 172° C. The product was recrystallized from 12 ml. of methanol to yield 0.27 gram of 5-bromo-5-fluoro-6-methoxy-5,6-dihydro-2′-deoxyuridine di-p-toluate melting at 172° to 173.5° C., $[\alpha]_D^{27.5} = -30.1$ (c. 1.0 in chloroform).

Anal.—Calcd. for $C_{26}H_{26}BrFN_2O_8$: Br, 13.48; $CH_3O$, 5.14. Found: Br, 12.27; $CH_3O$, 4.92.

EXAMPLE 6

*Preparation of 1-1[2′-deoxy-3′,5′-di-O-(p-toluoyl)-α-D-ribofuranosyl-5-bromo-5-fluoro - 6-methoxy-5,6-dihydro-2,4-(1H,3H)-pyrimidinedione]*

In this example, a solution of 19.3 grams (40 millimoles) of 1[2′ - deoxy - 3′,5′ - di-O-p-toluoyl)-d-D-ribofuranosyl-5-fluoro-2,4-(1H,3H)-pyrimidinedione] in 150 ml. of dimethyl formamide was reacted with methyl hypobromite until the optical density ($E_{280}$) of the reaction mixture had dropped to about 80,000. Thereafter, methanol was removed from the reaction mixture by evaporation in vacuo. Water was added to the dimethyl formamide solution, producing a precipitate which was filtered and washed with water. The precipitate (30.3 grams) was then dissolved in 400 ml. of hot methanol, following which the solution was clarified with Celite and partially evaporated to a volume of 200 ml. Upon cooling, the solution yielded 8.0 grams of crystalline 1-1[2′-deoxy-3′,5′-di-O - (p-toluoyl)-α-D-ribofuranosyl-5-bromo-5-fluoro-6-methoxy-5,6 - dihydro-2,4-(1H,3H)-pyrimidinedione] melting at 177° to 178° C. A second crop of crystals, in a yield of 3.0 grams, melting at a temperature of 169° to 173° C. was obtained by concentration of the mother liquor. There was obtained by this procedure l-1[2′-deoxy-3′,5′-di-O-(p-toluoyl)-α-D-ribofuranosyl-5 - bromo-5-fluoro-6-methoxy-5,6 - dihydro-2,4-(1H,3H)-pyrimidinedione] in a total yield amounting to 46.4% of theory; $[\alpha]_D^{24} = -7.85°$ (c. 2.0 in chloroform).

For analysis purposes, a 300 mg. samples of the product, produced as described in the preceding paragraph, was recrystallized from 5 ml. of methanol to yield 220 mg. of l-1[2′-deoxy-3′,5′-di-O-(p-toluoyl) - α - D - ribofuranosyl-5-bromo-5-fluoro-6-methoxy - 5,6 - dihydro - 2,4-(1H,3H)-pyrimidinedione], melting at 177.5° to 178° C.

Anal.—Calcd. for $C_{26}H_{26}BrFN_2O_8$: Br, 13.47; $CH_3O$, 5.23; F, 3.20. Found: Br, 13.46; $CH_3O$, 5.29; F, 2.96.

The methanolic mother liquor, described in the preceding paragraph, from which 30.3 grams of the levo compound was isolated, was evaporated in vacuo to a syrup. This syrup was dissolved in methanol. Addition of water to this methanol solution caused the formation of a tacky precipitate. This precipitate was dissolved in 40 ml. of ethanol and the ethanol solution was poured into 700 ml. of water. A precipitate was thus obtained which was filtered and washed with water. There was obtained 6.19 grams of the dextro isomer, namely, d-1[2′-deoxy-3′,5′ - di-O-(p-toluoyl)-α-D - ribofuranosyl-5 - bromo-5-fluoro-6-methoxy-5,6-dihydro - 2,4-(1H,3H)-pyrimidinedione], melting at 116° to 120° C.; $[\alpha]_D^{27.5} = +29.30$ (c. 2.0 in chloroform).

Anal.—Calcd. for $C_{26}H_{26}BrFN_2O_8$: Br, 13.42; F, 3.19; $CH_3O$, 5.21. Found: Br, 13.47; F, 2.92; $CH_3O$, 5.21.

EXAMPLE 7

*Preparation of 5-chloro-5-fluoro-6-t-butoxy-5,6-dihydro-2′-deoxyuridine*

In this example, a solution was prepared by dissolving 5.0 grams (20.3 millimoles) of 2′-deoxy-5-fluorouridine in 100 ml. of t-butanol. This solution was heated to a temperature of about 35° C. and 3 ml. (25.2 millimoles) of t-butyl hypochlorite was added thereto. The mixture was then heated at its reflux temperature for a period of about 80 minutes during which time the optical density of the reaction mixture $$(E_{270}^{EtOH})$$

had dropped from its initial reading of 157,000 to 1,740. When refluxing was completed, the reaction mixture was evaporated in vacuo to yield 11.25 grams of a thin syrup. This syrup was dissolved in about 50 ml. of benzene. Removal of the solvent by evaporation yielded a spongy mass which was repeatedly dissolved in ether and reevaporated. The residue, which was obtained by this procedure, was only slightly soluble in ether. This residue was triturated with portions of ether. The ether extracts were poured into petroleum ether to effect precipitation. In this step a total of about 100 ml. of ether and 800 ml. of petroleum ether was employed. The precipitate, which was thus obtained, was recovered by filtration and washed with petroleum ether. There was obtained 4.63 grams (65% of theory) of 5-chloro-5-fluoro-6-t-butoxy-5,6-dihydro-2′-deoxyuridine melting at a temperature of 59° to 64° C.; $[\alpha]_D = +27°$ (c. 1.0 in methanol).

Anal.—Calcd. for $C_{10}H_{13}ClFN_2O_2$: Cl, 9.99; F, 5.36; N, 7.90. Found: Cl, 10.40; F, 5.76; N, 8.12.

*(b) Preparation of 5-fluoro-6-t-butoxy-5,6-dihydro-2′-deoxyuridine*

354 mg. (1 millimole) of 5-chloro-5-fluoro-6-t-butoxy-5,6-dihydro-2′-deoxyuridine, prepared as described in section (a) of this example, was dissolved in 20 ml. of water and 2 ml. of ethanol containing 88 ml. (1.07 mm.) of sodium acetate. This compound was hydrogenated using 40 mg. of 10% palladium charcoal catalyst. In a period of about 35 minutes, 26.1 ml. of hydrogen had been taken up. When the hydrogenation was complete, the reaction mixture was filtered to remove the catalyst therefrom. The filtrate had an optical density $$(E_{280}^{0.1\,N\,HCl})$$

of 1816, corresponding to 0.28 millimole of 2′-deoxy-5-fluorouridine. In 1 N NaOH, it had an optical density $$(E_{268}^{1\,N\,NaOH})$$

of 7040, corresponding to 1 mole of 2′-deoxy-5-fluorouridine. This indicated the formation of 0.72 millimole of 5-fluoro-6-t-butoxy - 5,6 - dihydro-2′-deoxyuridine which was transformed into 2′-deoxy-5-fluorouridine by the addition of alkali.

EXAMPLE 8

*Preparation of 5-bromo-5-fluoro-6-methoxy-5,6-dihydrouridine*

An ice-cold solution of 31.2 millimoles of methyl hypobromite, freshly prepared from 0.8 ml. of bromine and 8.6 grams of silver carbonate, was added to a cold solution of 3.64 grams (13.9 millimoles) of 5-fluorouridine in 50 ml. of methanol. The reaction mixture was chilled for a period of about two hours, following which it was evaporated to a syrup. The syrup was subsequently dissolved in 25 ml. of water and stirred with silver carbonate. Thereafter, the solution was stirred with Dowex 50–X8 (H+ form) and then filtered. The filtrate was subsequently lyophilized to yield 5-bromo-5-fluoro-6-methoxy-5,6-dihydrouridine, $[\alpha]_D^{27}$ +6.8 (c. 1.0 in water), in the form of a white powder. The yield of this product amounted to 3.25 grams or 62.3% of theory.

Anal.—Calcd. for $C_{10}H_{14}BrFN_2O_7$: Br, 21.42; F, 5.09; N, 7.51. Found: Br, 19.49; F, 5.19; N, 7.48.

EXAMPLE 9

Preparation of 5-bromo-5-fluoro-6-acetoxy-5, 6-dihydro-2'-deoxyuridine diacetate In this example, a solution of 9.89 grams (33.4 millimoles) of 2'-deoxy-5-fluorouridine diacetate was dissolved in a mixture of 75 ml. of acetic acid and 75 ml. of acetic anhydride. Subsequently, there was added to this solution, with cooling and stirring, 5.8 grams (35 millimoles) of silver acetate and 1.8 ml. (35 millimoles) of bromine. The temperature of the reaction mixture was permitted to rise to about room temperature, following which the mixture was stirred for a period of about 30 minutes. The reaction mixture was then filtered and the insoluble silver bromide was washed with acetic acid. The filtrate was orange in color and it had an optical density $$(E_{280}^{EtOH}) \text{ of } 3450$$

The filtrate was evaporated in vacuo to syrup which, in turn, was dissolved in 50 ml. of ether. The ether solution was then clarified by filtration through Celite, following which the filtrate was poured into 700 ml. of petroleum ether, with stirring. After stirring for a period of about 15 minutes, a while powdery precipitate, and a tacky material which adhered to the beaker, formed. The precipitate was recovered by filtration and washed with petroleum ether to yield 6.69 grams of 5-bromo-5-fluoro-6-acetoxy-5,6 - dihydro-2'-deoxyuridine diacetate. The tacky material, which adhered to the beaker, was dissolved in 25 ml. of ether and it was re-precipitated with 250 ml. of petroleum ether to yield a total of 5.62 grams of 5-bromo-5-fluoro-6-acetoxy-5,6-dihydro-2' - deoxyuridine diacetate; $[\alpha]_D^{27} = +9.30$ (c. 1.0 in chloroform).

Anal.—Calcd. for $C_{15}H_{18}BrFN_2O_9$: C, 38.39; H, 3.87; N, 5.97; F, 4.05; Br, 17.03. Found: C, 38.71; H, 3.96; N, 5.81; F, 3.98; Br, 16.71.

It was found that, upon storage, the crystalline product which was obtained as described in the preceding paragraph in a yield of 6.69 grams, became tacky. This product was dissolved in 10 ml. of ether and the solution was poured, with stirring, into 250 ml. of petroleum ether. A gummy precipitate formed. This precipitate was redissolved in 75 ml. of ether and it was poured into the original mother liquor. After stirring for a period of about 30 minutes, a precipitate was formed and this was recovered by filtration to yield 4.87 grams of 5-bromo-5-fluoro-6-acetoxy-5,6 - dihydro-2'-deoxyuridine diacetate; $[\alpha]_D^{27} = +7.4$ (c. 2.0 in chloroform).

Anal.—Calcd. for $C_{15}H_{18}BrFN_2O_9$: C, 38.39; H, 3.87; Br, 17.03. Found: C, 38.31; H, 3.81; Br, 17.16.

EXAMPLE 10

Preparation of 5-bromo-5-fluoro-6-methoxy-5, 6-dihydro-2'-deoxycytidine

In this example, there was added 1.4 grams (5.07 millimoles) of silver carbonate to a cold solution of 0.25 ml. (4.88 millimoles) of bromine in 50 ml. of methanol. This mixture was stirred, with cooling, in an ice bath for a period of about 20 minutes. Thereafter, a cold solution of 1.0 gram (4.08 millimole) of 5-fluoro-2'-deoxycytidine in 100 ml. of methanol was added to that solution. The mixture was stirred and cooled for a period of about 10 minutes and it was found that, during that time, the optical density $$(E_{290}^{0.1 \text{ N HCl}})$$

of the mixture had dropped to 4,000. The reaction mixture was filtered to yield a colorless solution. This solution was lyophilized to obtain 1.75 grams of 5-bromo-5-fluoro-6-methoxy-5,6-dihydro-2'-deoxycytidine in the form of a powder. Analysis of the powder revealed that it contained an excess of bromine.

Anal.—Calcd. for $C_{10}H_{15}BrFN_3O_5$: Br, 22.44; F, 5.33; N, 11.80; $CH_3O$, 8.71. Found: Br, 28.27, 28.24; F, 4.48; N, 10.16, 10.22; $CH_3O$, 8.23, 8.15.

The product, obtained by the procedure described in the preceding paragraph, was dissolved in 15 ml. of water and it was chromatographed on a Dowex 1–X4 (acetate) column (1 x 11 cm.). Elution with water and subsequent lyophilization yielded 522 mg. (or 38.5% of theory) of 5-bromo-5-fluoro-6-methoxy-5,6 - dihydro-2'-deoxycytidine monohydrate; $[\alpha]_D^{27} = +41.3$ (c. 1.0 in methanol).

Anal.—Calcd. for $C_{10}H_{15}BrFN_3O_5+H_2O$: Br, 21.36; F, 5.08; N, 11.23; $CH_3O$, 8.29. Found: Br, 20.88; F, 5.29; N, 11.36; $CH_3O$, 8.10.

After additional elution with 180 ml. of water which yielded a negligible amount of material, 0.1 N acetic acid eluted a fraction of 80 ml. which was lyophilized to yield 600 mg. of product whose analysis corresponded to N,5-di-bromo-5-fluoro-6-methoxy-5,6 - dihydro-2'-deoxycytidine monohydrate.

Anal.—Calcd. for $C_{10}H_{13}Br_2FN_3O_5+H_2O$: Br, 35.28; N, 9.27; $CH_3O$, 6.85. Found: Br, 34.93; N, 9.30; $CH_3O$, 6.95.

The product which carries a bromine atom on the amino nitrogen atom gives a positive starch iodide reaction.

I claim:
1. A compound of the formula:

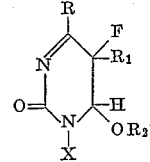

in which R is a member selected from the group consisting of hydroxy and amino, $R_1$ is a member selected from the group consisting of hydrogen, bromine and chlorine, $R_2$ is a member selected from the group consisting of hydrogen, lower-alkyl and lower-aliphatic acyl and X is a member selected from the group consisting of ribose, α-deoxyribose, β-deoxyribose and acylated derivatives thereof, the acyl moieties of said acylated derivatives being selected from the group consisting of lower-aliphatic acyl, benzoyl and lower-alkyl substituted benzoyl.

2. A compound of the formula:

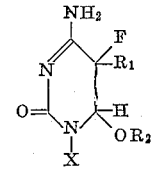

in which $R_1$ is a member selected from the group consisting of hydrogen, bromine and chlorine, $R_2$ is a member selected from the group consisting of hydrogen, lower-alkyl and lower-aliphatic acyl and X is a member selected from the group consisting of ribose, α-deoxyribose, β-deoxyribose and acylated derivatives thereof, the acyl moieties of said acylated derivatives being selected from the group consisting of lower-aliphatic acyl, benzoyl and lower-alkyl substituted benzoyl.

3. A compound of claim 2 wherein $R_1$ is a member selected from the group consisting of bromine and chlorine, $R_2$ is lower-alkyl and X is ribose.

4. A compound of the formula:

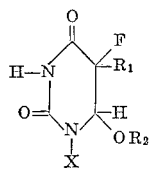

in which $R_1$ is a member selected from the group consisting of hydrogen, bromine and chlorine, $R_2$ is a member selected from the group consisting of hydrogen, lower-alkyl and lower-aliphatic acyl and X is a member selected from the group consisting of ribose, α-deoxyribose, β-deoxyribose and acylated derivatives thereof, the acyl moieties of said acylated derivatives being selected from the group consisting of lower-aliphatic acyl, benzoyl and lower-alkyl substituted benzoyl.

5. The compound of claim 4 wherein X is ribose, $R_1$ is bromine and $R_2$ is lower-alkyl.

6. The compound of claim 4 wherein X is α-deoxyribose, $R_1$ is bromine and $R_2$ is lower-alkyl.

7. The compound of claim 4 wherein X is β-deoxyribose, $R_1$ is bromine and $R_2$ is lower-alkyl.

8. The compound of claim 4 wherein X is β-deoxyribose, $R_1$ is bromine and $R_2$ is lower-aliphatic acyl.

9. The compound of claim 4 wherein X is β-deoxyribose, $R_1$ is bromine and $R_2$ is hydrogen.

10. The compound of claim 4 wherein X is β-deoxyribose, $R_1$ is hydrogen and $R_2$ is lower-alkyl.

11. The compound of claim 4 wherein X is β-deoxyribose, $R_1$ is hydrogen and $R_2$ is hydrogen.

12. The compound of claim 4 wherein X is acetylated β-deoxyribose, $R_1$ is bromine and $R_2$ is lower-alkyl.

References Cited by the Examiner
UNITED STATES PATENTS
2,993,039   7/1961   Schroeder _____ 260—211.5

LEWIS GOTTS, *Primary Examiner.*